April 12, 1927.  
M. SCHNAIER  
1,624,679

APPARATUS FOR FREEZING AND MOLDING CONFECTIONS

Filed April 26, 1924      4 Sheets-Sheet 1

INVENTOR,
Milton Schnaier
BY
Conrad A. Dieterich
his ATTORNEY

April 12, 1927. 1,624,679
M. SCHNAIER
APPARATUS FOR FREEZING AND MOLDING CONFECTIONS
Filed April 26, 1924 4 Sheets-Sheet 2
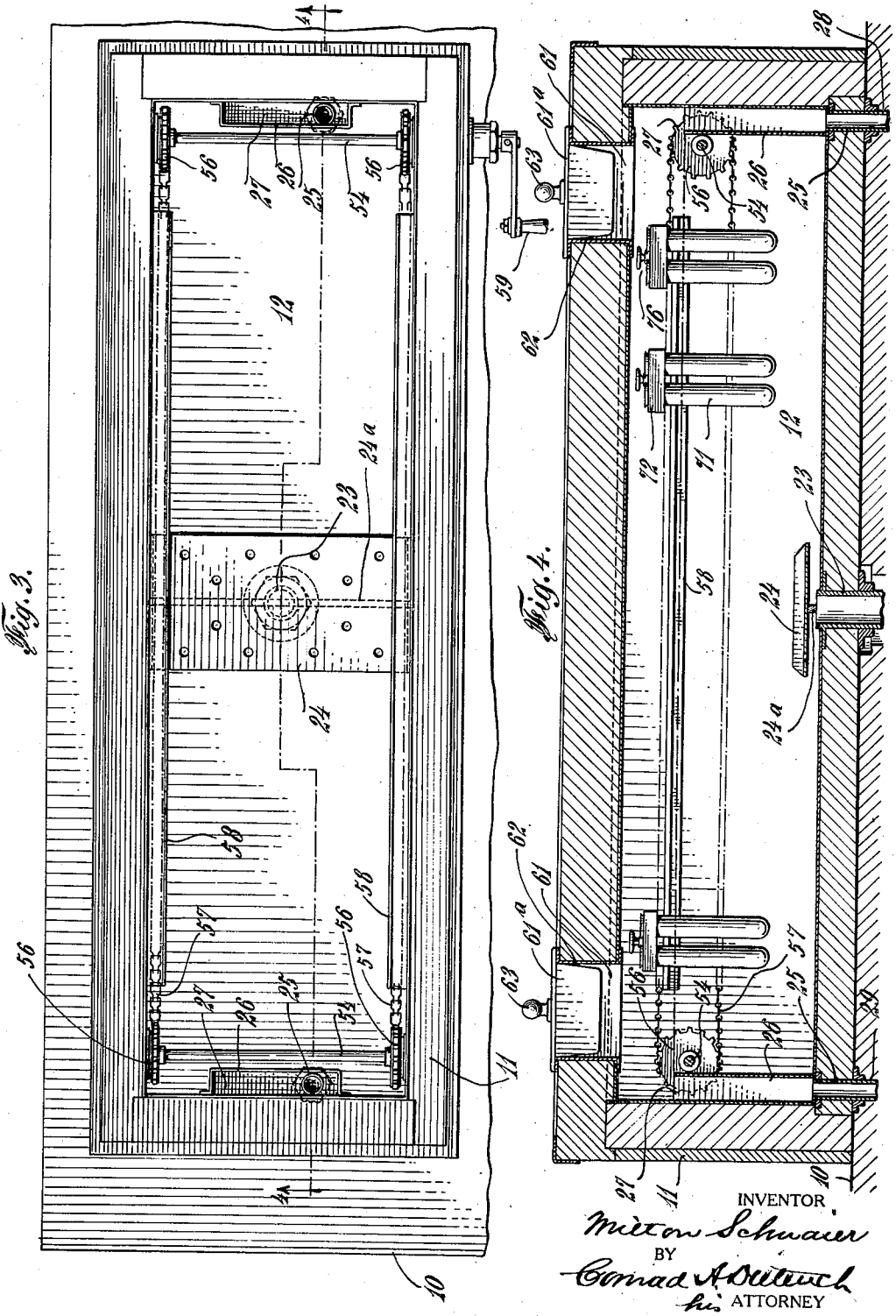

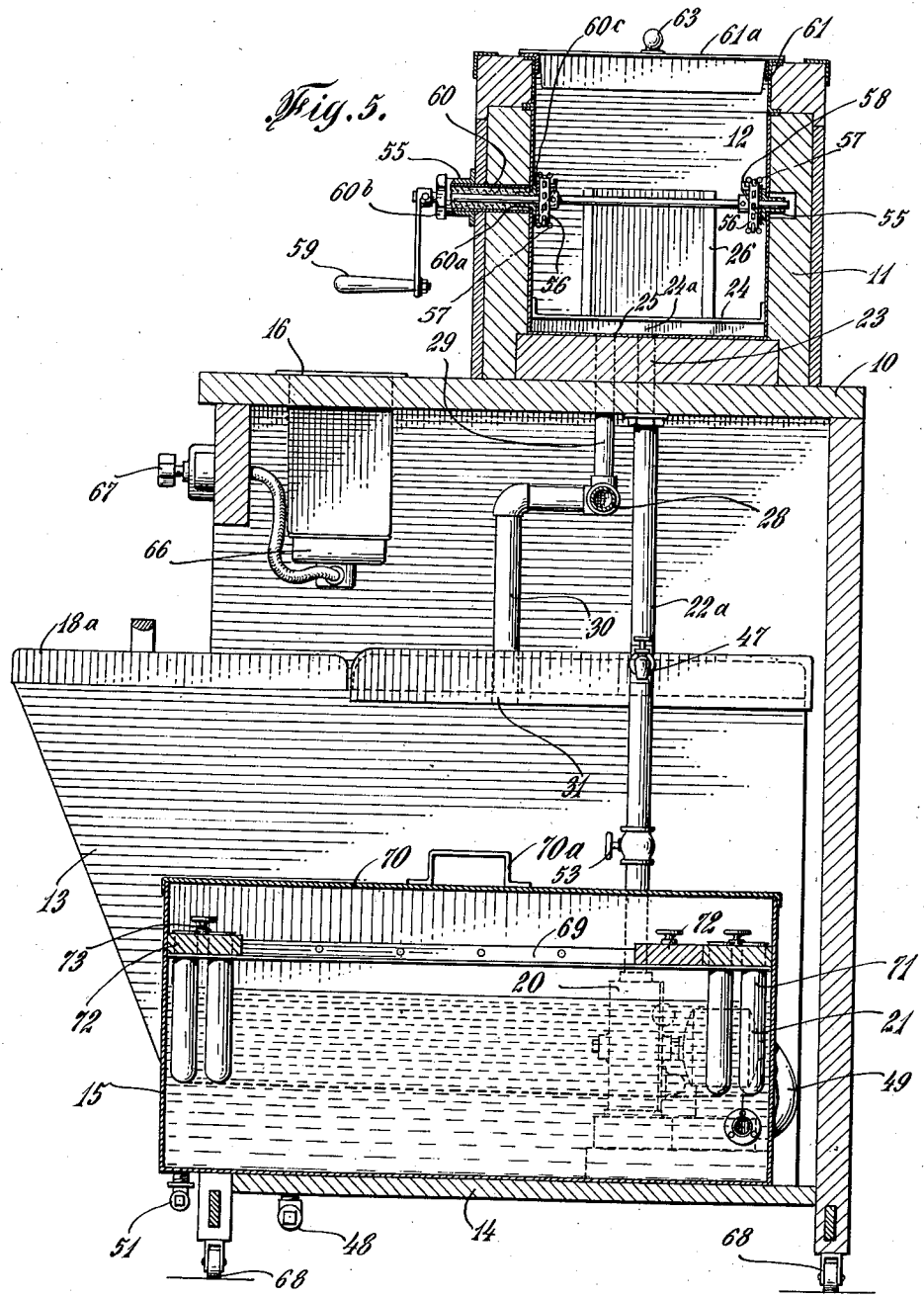

April 12, 1927.
M. SCHNAIER
1,624,679
APPARATUS FOR FREEZING AND MOLDING CONFECTIONS
Filed April 26, 1924     4 Sheets-Sheet 4
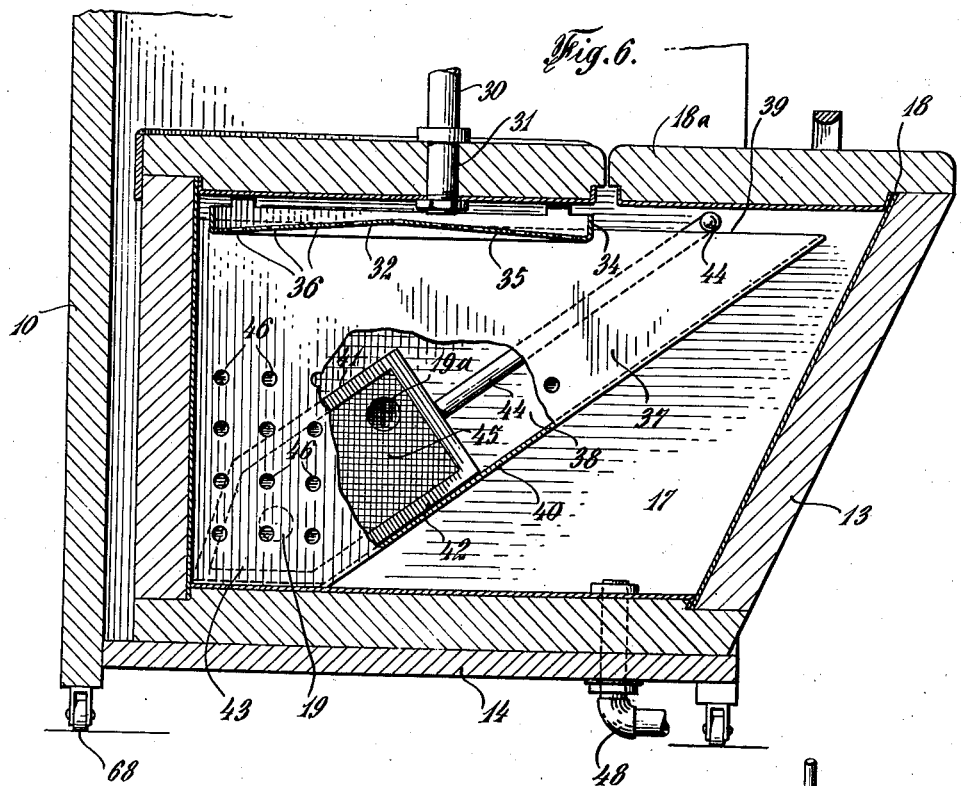
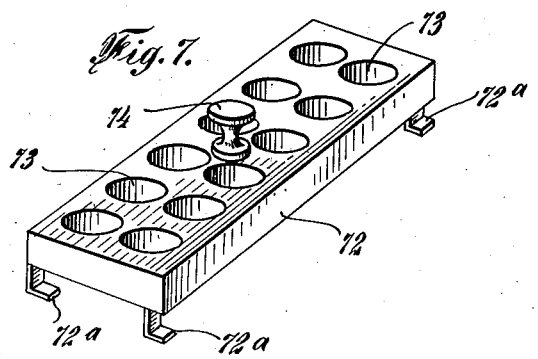
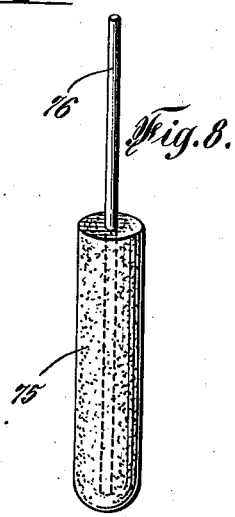
INVENTOR.
Milton Schnaier
BY
Conrad A. Dieterich
his ATTORNEY Patented Apr. 12, 1927.

1,624,679

UNITED STATES PATENT OFFICE.

MILTON SCHNAIER, OF NEW YORK, N. Y.

APPARATUS FOR FREEZING AND MOLDING CONFECTIONS.

Application filed April 26, 1924. Serial No. 709,179.

My invention relates to improvements in apparatus for freezing and molding confections, and the same has for its object more particularly to provide a simple, efficient and reliable apparatus which is compact in form and readily operable to form or mold dainties or confections, such as ices and ice creams, in individual portions convenient to hold in the hand for eating.

Further, said invention has for its object to provide an apparatus in which a confection of the character specified may be continuously formed or molded in relatively large quantities under sanitary and clean conditions.

Further, said invention has for its object to provide an apparatus in which a confection is disposed upon a mechanically actuated support within a treating receptacle and is carried by said support through said receptacle to form or mold the confection.

Further, said invention has for its object to provide an apparatus in which an auxiliary cooling receptacle, a freezing receptacle, and a product releasing means are conveniently associated to successively receive the confection units to mold the same, and to permit of their ready removal from the molds or containers therefor when frozen, and ready to be eaten.

Further, said invention has for its object to provide an apparatus in which the auxiliary cooling receptacle serves to temporarily and preliminarily receive and cool the confection and the molds therefor prior to the disposition thereof into the freezing receptacle, whereby to shorten the time required for the operation in the freezing receptacle, and in order to increase production.

Further, said invention has for its object to provide an apparatus in which the overflow of cooling agent from the refrigerating receptacle is utilized for cooling the auxiliary receptacle.

Further, said invention has for its object to provide an apparatus in which the refrigerating receptacle is disposed below the freezing receptacle, and in which the freezing agent is pumped into the freezing receptacle from the refrigerating receptacle and is withdrawn therefrom and returned to the refrigerating receptacle by gravity flow and showered over the refrigerating medium to uniformly cool the said agent to the desired extent.

Further, said invention has for its object to provide an apparatus in which the temperature varying or refrigerating means is disposed exteriorly of the receptacle for treating the confection, and in which the mechanically actuated support or conveyor for the confection is disposed within the treating receptacle to permit the unimpeded travel of the confection from end to end of the freezing receptacle through the treating agent, thus insuring complete treatment of the confection and speeding up the production.

Further, said invention has for its object to provide an apparatus in which the confection is formed or molded as individual portions in molds or containers therefor supported in frames, in which the several frames are successively received in a freezing receptacle, at one end thereof, and disposed upon the conveyor and successively discharged from the opposite end thereof to permit the contents of the molds to be properly frozen during the travel thereof from end to end of the receptacle, and to speed up the production, and in which the contents of the several molds, during the freezing operation, are protected by the frames upon the conveyor against access of the freezing liquid thereto.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention, Figure 1 is a front elevation showing one form of apparatus constructed according to and embodying my said invention;

Fig. 3 is a plan or top view of the freezing receptacle with the top thereof removed to show the interior mechanisms;

Fig. 4 is a longitudinal section taken on line 4—4 of Fig. 3;

Fig. 5 is a transverse section on the line 5—5 of Fig. 1, looking in the direction of the arrow;

Fig. 6 is a transverse section on the line 6—6 of Fig. 1, looking in the direction of the arrow;

Fig. 7 is a perspective view of a mold frame, and

Fig. 8 is a perspective view of the product which is formed by means of the apparatus embodying my said invention.

Figure 1:
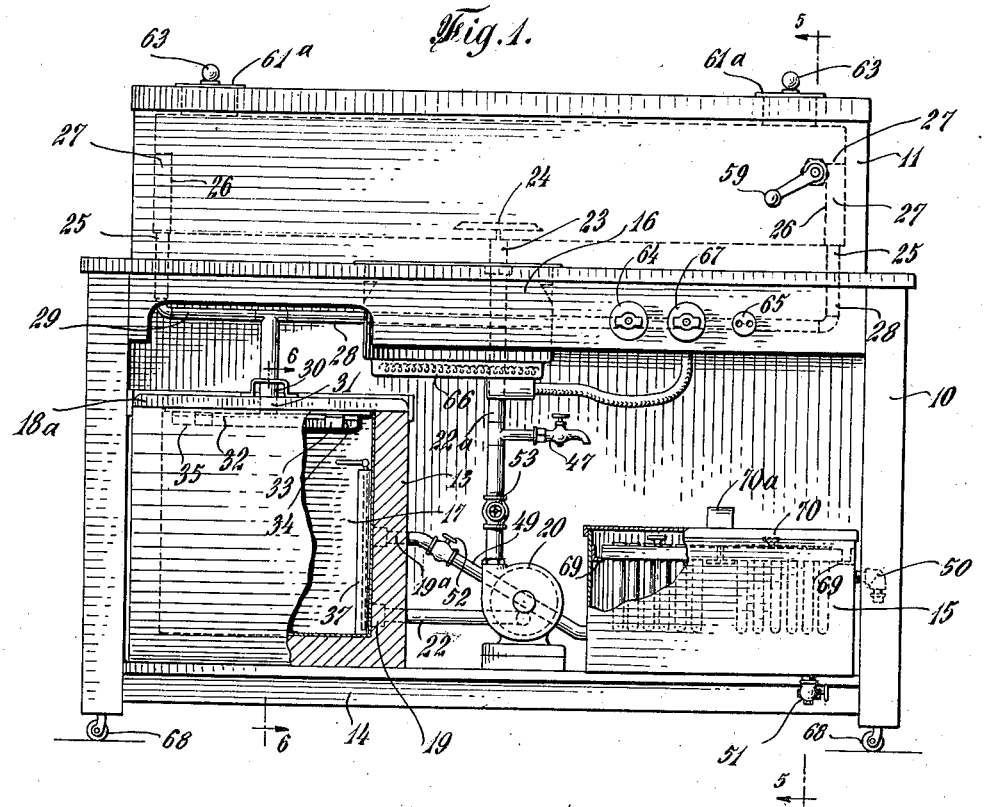
Figure 2:
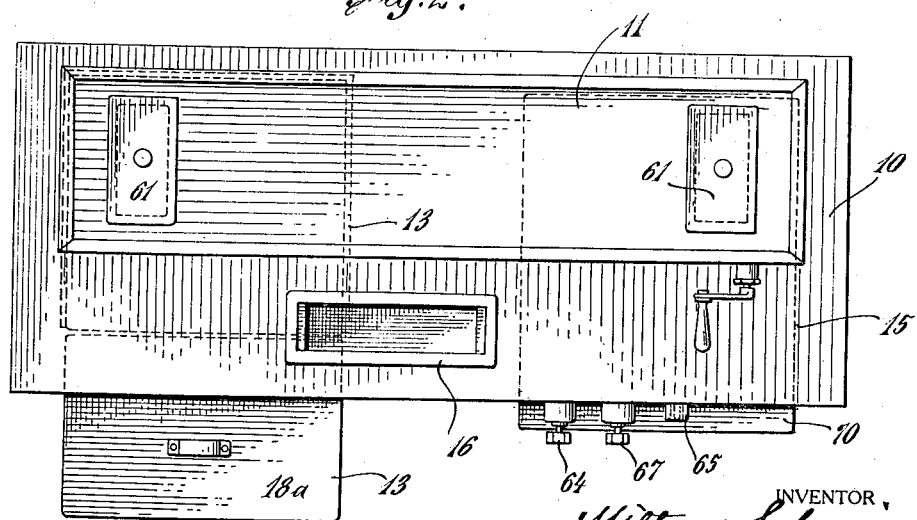
Fig. 2 is a plan thereof.

In said drawings is illustrated a supporting frame or table 10 on which rests a receptacle or tank 11 having a free unobstructed interior space 12 adapted to receive or contain a freezing agent or fluid such, for instance, as a brine, or a suitable mixture of water and alcohol.

A refrigerating receptacle or tank 13 is supported below the tank 11 on the base 14 of the frame 10 at one end thereof. An auxiliary receptacle or tank 15 is supported upon said base 14 at the opposite end thereof. Product releasing means, such as the receptacle 16, is disposed within the upper portion of the table in front of the receptacle 11 with the upper edge thereof substantially flush with the surface on which the receptacle or tank 11 rests.

The receptacle 13 has top, bottom and side walls enclosing a chamber 17 therein for receiving or containing the refrigerating medium, such as ice, and the freezing agent to be cooled thereby, the said refrigerating medium and the said freezing agent being preferably in direct contact with each other in said receptacle 13. The forward end of the receptacle 13 projects beyond the table 10 and the front wall thereof inclines downwardly and rearwardly. The projecting portion of the top of the receptacle 13 has an opening 18 therein through which the ice and freezing agent are introduced into the receptacle 13. This opening is normally closed by a cover 18ª.

The receptacle 13 is provided with an outlet 19 through the lower portion of one wall thereof. A pump 20 and a motor 21 for operating the same are mounted on the base 14. The freezing agent is drawn by the pump 20 through a pipe 22 connected with the outlet 19 and forced through a pipe 22ª into the interior of the tank 11 having a central inlet 23 in the bottom thereof with which the pipe 22ª is connected. A horizontally arranged perforated plate 24 is disposed above the inlet 23 in spaced relation thereto to prevent foreign matter from clogging said inlet. A transverse vertical partition 24ª is disposed below the plate 24 and bisects the inlet 23 to divide the freezing agent entering therethrough and to direct the agent towards opposite ends of the receptacle 11. The outlets 25 are provided through the bottom of the tank 11 at opposite ends. Angular members or barriers 26 are secured to the end walls and bottom of the receptacle 11 around the outlets 25 to provide elevated overflow inlets 27 to the outlets 25, whereby the level of the freezing agent within the receptacle 11 is maintained on a line with the upper edges of said barriers 26.

The outlets 25 are connected by branch pipes 28 and 29, and a pipe 30 with the inlet 31 through the portion of the top of the refrigerating receptacle 13 located below the table 10.

A perforated member or pan 32 is horizontally arranged within receptacle 13 below the inlet 31 and is secured to the top of the receptacle by the flanged lugs or attaching devices 33 thereon. The pan 32 comprises vertical side walls 34 and a bottom 35 sloping from the center thereof downwardly to the lower edges of said side walls 34. The bottom 35 is provided with a plurality of holes 36 distributed over the entire surface thereof through which the freezing agent received by the pan 32 escapes in a series of divided streams, and is rained or showered upon the ice within the receptacle 13 to insure the uniform cooling thereof.

A flanged member 37 is secured to the inner side of the receptacle 13, over the outlet 19 and over an overflow outlet 19ª for the receptacle 13 arranged at a higher elevation than that of the outlet 19, to provide a narrow vertical pocket 38 behind the same having an opening 39 at the top thereof below the cover 18ª and an inclined lower guiding wall 40. The pocket 38 is adapted to receive a screen or strainer 41 which comprises a frame 42 tapered at one end 43 and provided at its opposite end with a handle 44, and a suitable gauze or screening 45 secured to said frame 42. The member 37 has holes 46 therein to permit passage of the freezing agent therethrough to the outlets 19, 19ª.

The screen 41 is for the purpose of preventing the escape of foreign or solid material through the outlets 19, 19ª, which might cause the pipes therefrom and pump 20 to become clogged. The said screen 41 may be readily removed from the pocket 38 by means of the handle 44 and withdrawn through the opening 18 for the purpose of cleaning said screen or to permit increased flow of freezing agent through the outlets. In replacing the screen 41 the same is guided along the inclined base 40 and is disposed diagonally within the receptacle 13 over the outlets 19, 19ª. The perforate member 37 not only provides a pocket to receive the frame 42 but also protects the gauze 45 against damage by the ice within the receptacle 13.

The receptacles 11 and 13 are provided at the bottoms thereof with draining valves 47 and 48. The overflow outlet 19ª communicates through the pipe 49 with the lower portion of the interior of the cooling tank 15. The cooling tank 15 at an upper portion thereof has an overflow outlet 50 to waste, and at the bottom a draining valve 51. The pipes 49 and 22ª are provided with suitable valves 52 and 53 for controlling the flow of freezing or cooling agent to the cooling tank 15 and to the freezing receptacle 11, respectively.

Shafts 54 are arranged at opposite ends of the receptacle 11 and are supported in the opposite walls thereof in fluid tight bearings 55 located slightly below the level of the freezing agent in said receptacle 11. Pulleys or sprockets 56 are secured to each shaft 54 near the side walls of the receptacle. An endless conveyor or chain 57 is disposed around each pair of sprockets 56. The upper strands or portions of the conveyors 57 are supported by members 58 secured to the opposite side walls of the receptacle at or slightly above the level of the freezing liquid therein. One of the shafts 54 extends through a fluid tight bearing in the front side wall of the receptacle 11 and is provided at its outer end with an actuating handle or crank 59. This fluid tight bearing comprises a suitable packing sleeve 60, an inner bushing 60ª having a flange soldered to the metal lining of the receptacle 11, and an outer packing box nut 60ᵇ threaded upon the sleeve 60. A washer 60ᶜ is disposed between the bushing 60ª and adjacent sprocket 56.

The receptacle 11 which is substantially entirely closed is provided at the top thereof adjacent to the opposite ends with openings 61, having removable closures or covers 61ª, through which the confections may be introduced and removed. The closures 61ª comprise relatively thick blocklike members covered with rubber facings or coverings 62 to provide tight joints between said closures and the receptacle 11 when the closures are in position. Finger pieces 63 are secured to the covers 16ª for lifting the same.

Mounted at the front of the table 10 is an electric motor starting switch 64, and a plug socket 65 for connection with a source of electric current. The warming receptacle 16 is provided with resistance or heating elements 66 disposed below the same and controlled by a switch 67.

The entire apparatus is supported on rollers or castors 68 whereby the same may be transported from place to place.

The receptacle 11 and preferably the other receptacles are constructed of a light material having heat insulating properties, such as balsa wood exteriorly covered with cypress or pine, and interiorly lined with copper.

The cooling tank 15 is provided upon its inner sides with supporting ledges 69. A removable cover 70 having a handle 70ª closes the top thereof.

The confections or mixtures to be treated or frozen are placed in small receptacles or molds 71. Ordinary test tubes may be employed as such molds. The molds 71 are supported by the mold receiving members or frames 72 (Fig. 7) having holes 73 therein through which the molds 71 are inserted. Finger pieces 74 are secured to the frames 72 to permit of the convenient handling thereof during the operations. The said frames 72 may be provided at their corners with angular projections or hooks 72ª adapted to engage with the chain conveyor or belt 57.

The operation of the apparatus is substantially as follows: When the motor 21 is started the pump 20 draws the freezing agent or liquid from the refrigerating receptacle 13 and forces the same into the freezing receptacle 11. The freezing liquid is maintained in the receptacle 11 substantially on a level with the conveyors 57. Surplus liquid overflowing through the outlets 27 returns to the refrigerating receptacle 13 by gravity flow, and is subdivided therein by the perforated pan 32. The agent or liquid is thereby cooled and continuously circulated through the apparatus. The temperature of the freezing agent is thus maintained sufficiently low to freeze the confections. The colder liquid enters the receptacle 11 at the bottom thereof, and the relatively warmer liquid at the top overflows and returns to the refrigerating receptacle. By circulating the freezing agent through a separate receptacle 13, the interior space 12 of the receptacle 11 is rendered substantially free and unobstructed to permit of the insertion of the members 72 into the receptacle at one end and the removal thereof at the opposite end.

To freeze the confections, the fluid mixtures for producing the same are placed in the several molds 71, which are held in position within the frames 72 by the holes 73 therein. The several frames 72, with the partially filled molds 71 therein, are then inserted successively through the opening at one end of the receptacle 11, the ends of the members 72 resting on the conveyors or chains 57 constituting supports therefor, with the hooks or projection 72ª engaging said conveyors or chains and said conveyors then moved towards the opposite end of the receptacle by means of the operating crank 59. As each frame 72 is inserted at one end, the previously inserted frames resting on the conveyors have moved towards the opposite end of the receptacle until, if so desired, the several frames form a substantially continuous sectional partition, as illustrated, extending from end to end of the receptacle 11.

The normal level of the freezing liquid within the receptacle 11 should be on a line with, or slightly below, the conveyors 57. The member 72 (or the partition formed thereby) serves, therefore, to prevent the access of the freezing liquid into the upper ends of the several molds 71 and the mixing thereof with the contents of said mold, which would result in the ruining of the same. The movement of the several frames 72, from one end of the receptacle 11 to the opposite end thereof, should be so timed as to insure the due freezing of the confection by the time each member 72 reaches its point of removal. The members 72 are then successively discharged from the opposite end of the receptacle 11. The molds 71 with their frozen contents are then warmed sufficiently to loosen the contents from their molds by lowering the frame for an instant into the warming receptacle 16, which preferably contains heated water. The contents of the molds may thereupon be easily and quickly removed. The molds are then refilled and the members 72 holding the same reinserted in receptacle 11 at the starting end thereof, and the operation repeated.

The cooling tank 15 is utilized to temporarily receive the several frames 72 with the partially filled molds 71 therein and to preliminarily cool the same in case the receptacle 11 is loaded to its maximum. The tank 15 is maintained at a low temperature by the overflow of freezing agent through pipe 49 from the refrigerating receptacle 13, the freezing agent filling the cooling receptacle 15 to a point slightly below the supporting ledges 69 therein for the frames 72. The contents of the molds 71 being previously partially cooled in the receptacle 15, less time is required to complete the freezing operation in the receptacle 11, whereby production is increased.

The product formed or molded is illustrated in Fig. 8 and consists of a frozen mass 75 of the confection which is supported upon a stick 76 for holding the same. The stick 76 is positioned in the mold with its lower end in the liquid to be frozen, at the beginning of the operation.

The above described apparatus is characterized by efficiency and economy of operation. The construction or arrangement of the apparatus permits of the convenient insertion of the confection into the freezing receptacle, and its removal therefrom thereby insuring large production thereof, when required. The operation of forming or molding the confection is substantially continuous, and the frozen product may be continually removed at one end of the receptacle 11 as additional material is being inserted at the opposite end of the receptacle 11 to be frozen. The members 72 are readily moved from end to end of the receptacle 11 upon the conveyors 57 at a rate to insure the desired degree of freezing thereof by the time the same reach the end of their travel. The confections to be formed or frozen, furthermore, are kept clean during the treatment, and the access of the freezing liquid thereto is prevented.

Further, by means of my invention, the freezing liquid is kept at the required temperature by means arranged exteriorly of the freezing receptacle 11 to permit of the unobstructed travel of the members 72 from end to end of said receptacle 11.

The provision of the auxiliary cooling tank 15 utilizing the overflow from the refrigerating receptacle 13 is not only economical in operation but also serves to speed up production as hereinbefore described.

Having thus described my said invention, what I claim and desire to secure by Letters Patent is:

1. An apparatus of the character described comprising a support, a refrigerating receptacle, a freezing receptacle, and an auxiliary receptacle on said support; said auxiliary receptacle being disposed at the side of said refrigerating receptacle, means for circulating a freezing agent through said freezing and refrigerating receptacles, an elevated overthrow outlet in said refrigerating receptacle, and a conduit connecting said overflow outlet with said auxiliary receptacle, substantially as specified.

2. An apparatus of the character described comprising a support, a freezing receptacle thereon, an auxiliary cooling receptacle, and a refrigerating receptacle mounted on said support below said freezing receptacle, means for conducting a freezing agent from said refrigerating receptacle into the lower portion of said freezing receptacle, an elevated overflow outlet in said freezing receptacle, a gravity flow return connection therefrom to said refrigerating receptacle, an elevated overflow outlet in said refrigerating receptacle, and a connection extending from said last named outlet to said auxiliary receptacle, substantially as specified.

3. An apparatus of the character described comprising a receptacle adapted to receive a freezing liquid, a refrigerating receptacle adapted to contain a refrigerating agent, an inlet in said freezing receptacle arranged centrally of the bottom thereof, elevated overflow outlets at the opposite ends of said freezing receptacle, means connecting said inlet and said outlets with said refrigerating receptacle to permit circulation of said liquid through said receptacles, a vertical dividing member disposed over said inlet, and a horizontal member above said dividing member to deflect the liquid towards the ends of said freezing receptacle, substantially as specified.

4. An apparatus of the character described comprising a receptacle enclosing a substantially unobstructed space and adapted to receive a fluid, means arranged exteriorly of said receptacle for varying the temperature of said fluid, endless conveyors disposed within said receptacle at opposite sides thereof, means for actuating said conveyors, a plurality of frames having openings therein and supported on said conveyors; said frames being arranged edge to edge to provide a partition within said receptacle, confection receiving containers disposed within said openings with the upper ends thereof located above said partition, and means at the opposite ends of said receptacle for the reception and discharge of said members, substantially as specified.

5. An apparatus of the character described comprising a support, a closed freezing receptacle thereon, openings in the top of said receptacle at opposite ends thereof for the reception and discharge of the substance to be treated in said freezing receptacle, supporting members in said freezing receptacle, an auxiliary cooling receptacle, and a refrigerating receptacle mounted on said support below said freezing receptacle, means for forcing a freezing agent from said refrigerating receptacle into the lower portion of said freezing receptacle, an elevated overflow outlet in said freezing receptacle, a gravity flow return connection therefrom to said refrigerating receptacle, an elevated overflow outlet in said refrigerating receptacle, a connection therefrom to said auxiliary receptacle, product releasing means on said support adjacent to said freezing receptacle, and mold supporting frames adapted to be disposed within said auxiliary and freezing receptacles to form the product and to be acted upon by said releasing means to permit the removal of said product from the molds, substantially as specified.

6. An apparatus of the character described comprising a support, a closed freezing receptacle thereon having openings in the top at opposite ends thereof, supporting members in said freezing receptacle, a refrigerating receptacle mounted on said support below said freezing receptacle, means for forcing a freezing agent from said refrigerating receptacle into the lower portion of said freezing receptacle, an elevated overflow outlet in said freezing receptacle, a gravity flow return connection therefrom to said refrigerating receptacle, and mold supporting members adapted to be disposed within said freezing receptacle upon said first named supporting members; said openings being for the reception and discharge of said mold supporting members into and from said freezing receptacle, substantially as specified.

7. An apparatus of the character described comprising a receptacle enclosing a substantially unobstructed space, a cover for said receptacle, a traveling support within said receptacle below said cover, means for actuating said support, mold receiving members adapted to be carried by said support and to be moved thereby from one end of said receptacle to the opposite end thereof; said cover having openings therein at opposite ends thereof for the reception and discharge of said mold receiving members, a refrigerating receptacle below said freezing receptacle, an inlet in said freezing receptacle arranged centrally of the lower portion thereof, elevated overflow outlets at opposite ends of said freezing receptacle, and means connecting said inlet and said outlets with said refrigerating receptacle to permit circulation of a freezing agent through said receptacles, substantially as specified.

Signed at the city of New York, in the county and State of New York, this tenth day of April, one thousand nine hundred and twenty-four.

MILTON SCHNAIER.